US006315969B1

(12) United States Patent
Yoshida

(10) Patent No.: US 6,315,969 B1
(45) Date of Patent: Nov. 13, 2001

(54) GAS RE-CIRCULATION SELECTIVE CATALYTIC REDUCTION SYSTEM WITH HEAT TRACE

(75) Inventor: Ricardo R. Yoshida, Newport Beach, CA (US)

(73) Assignee: Mitsubishi Heavy Industries America, Inc., New York, NY (US)

(*) Notice: Subject to any disclaimer, the term of this patent is extended or adjusted under 35 U.S.C. 154(b) by 0 days.

(21) Appl. No.: 09/507,268

(22) Filed: Feb. 18, 2000

(51) Int. Cl.[7] ................... B01J 70/00; B01J 8/02
(52) U.S. Cl. ............ 423/239.1; 422/174; 422/177; 422/195; 422/198; 422/199; 422/211; 422/235
(58) Field of Search ............... 423/235, 239.1; 422/168, 173, 174, 175, 177, 198, 199, 211, 235

(56) References Cited

U.S. PATENT DOCUMENTS

| 5,296,206 | 3/1994 | Cho et al. |
| 5,618,499 | * 4/1997 | Lewis et al. ............ 422/177 |
| 5,884,475 | 3/1999 | Hofmann et al. ............ 60/274 |
| 5,976,475 | 11/1999 | Peter-Hoblyn et al. ............ 423/212 |

FOREIGN PATENT DOCUMENTS

| 198 55 385 | 1/1998 | (DE) ............ F01N/3/20 |
| 0 199 186 | 4/1986 | (EP) ............ B01D/53/36 |
| 0 278 241 | 1/1988 | (EP) ............ B01D/53/34 |

OTHER PUBLICATIONS

Perry's Chemical Engineers' Handbook, 7th edition, pp. 10–133 to 10–138.*

* cited by examiner

Primary Examiner—Steven P. Griffin
Assistant Examiner—Maribel Medina
(74) Attorney, Agent, or Firm—Pillsbury Winthrop LLP

(57) ABSTRACT

A gas re-circulation selective catalytic reduction system. A vaporizer is provided for producing a diluted reducing agent. A reducing agent source, for storing a reducing agent, has a reducing agent pipe interconnected to the vaporizer. A re-circulation gas pipe is adapted to carry gas from a gas flow to the vaporizer. A dilution fan may be provided for propelling the gas from the gas flow to the vaporizer. An injector, connected to the vaporizer by a diluted reducing agent pipe, injects the diluted reducing agent into the gas flow. A heat trace is coupled to the diluted reducing agent pipe and the injector for maintaining a predetermined temperature of the diluted reducing agent pipe and the injector sufficient to substantially prevent the formation of ammonium bisulfate within the insides of the diluted reducing agent pipe and the injector.

27 Claims, 3 Drawing Sheets

GAS RE-CIRCULATION SELECTIVE CATALYTIC REDUCTION SYSTEM WITH HEAT TRACE

BACKGROUND OF THE INVENTION

Field of the Invention

The present invention relates to a method and apparatus for efficient utilization of a gas re-circulation selective catalytic reduction (SCR) system with heat trace. 2. Background of the Invention Selective catalytic reduction (SCR) reactor technology is being used with increasing frequency to treat the exhaust gases from an industrial process, such as energy production, before the gas is released into the atmosphere. The SCR reactor process relies on the use of a catalyst to treat the exhaust gas as the gas passes through the SCR reactor. Because the catalyst is an integral part of the chemical reaction, great effort is used to provide maximum exposure of the catalyst to the exhaust gas and to ensure that all the exhaust gas comes sufficiently into contact with the catalyst for treatment.

The combustion of fossil fuels, such as coal, oil, and industrial or natural gas produces environmentally hazardous substances, including nitrogen oxide (NO) and nitrogen dioxide ($NO_2$). Nitrogen oxide and nitrogen dioxide are collectively called $NO_x$. In the normal combustion process of fossil fuels, the major portion of $NO_x$ is NO. The production of $NO_x$ can occur when fossil fuel is combusted in a variety of apparatuses, including refinery heaters, gas turbine systems, and boilers, such as in steam plants. The fuel may include coal, oil, gas, waste products, such as municipal solid waste, and a variety of other carbonaceous materials.

There are a number of known $NO_x$ reducing agents. A commonly used $NO_x$ reducing agent is ammonia. The principal process for the removal of $NO_x$ from the flue gas flow is the injection of a reducing agent, such as ammonia, urea, or any of a number of other known reducing agents, into the flue gas flow. For example, the selective catalytic reduction of $NO_x$ involving the injection of ammonia ($NH_3$) into a flue gas flow in the presence of a catalyst occurs as the following chemical reactions:

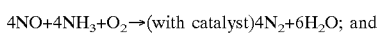

$4NO + 4NH_3 + O_2 \rightarrow$ (with catalyst) $4N_2 + 6H_2O$; and

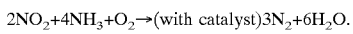

$2NO_2 + 4NH_3 + O_2 \rightarrow$ (with catalyst) $3N_2 + 6H_2O$.

One method of injecting ammonia into a flue gas flow utilizes an external ammonia vaporization system in which liquid ammonia (either in anhydrous or aqueous state) is vaporized in a heater or vaporizer, mixed with air, and then routed to a distribution/injector grid for injection into the flue gas flow at a location "upstream" of an SCR reactor. Because anhydrous ammonia is toxic and hazardous, the general practice is to use a mixture of ammonia and water ($NH_3.H_2O$). Ammonia diluted with water, i.e., aqueous ammonia, is less hazardous than anhydrous ammonia. A typical industrial-grade aqueous ammonia contains approximately 30% ammonia and 70% water. The ammonia-water mixture of the above mentioned percentages is safely transported on highways, and it has negligible vapor pressure at ordinary temperatures.

For the SCR systems that utilize ammonia, there are several ways to vaporize the ammonia. One method utilizes an electric heater to heat ambient air and mix it with aqueous ammonia in a vessel, thus vaporizing the aqueous ammonia. Another method utilizes a kettle-type heat exchanger tank in which a tank is filled with aqueous ammonia. The tank contains coils that are supplied with steam to vaporize the aqueous ammonia. Still another method utilizes an ammonia stripping tower in which aqueous ammonia is sprayed into the top of a fluid-fluid type contact tower, and steam is introduced into the bottom. A fourth method utilizes a flue gas slip-stream that is drawn by a blower into a vaporizer vessel where the flue gas mixes with and vaporizes the aqueous ammonia. FIG. 1 illustrates a prior art gas re-circulation selective catalytic reduction system. Hot flue gas is drawn into the vaporizer 100 by a dilution fan 130, and the reducing agent is vaporized to form a diluted reducing agent mixture, which is sent to the injector 160 for injection into the gas flow within the boiler 190.

U.S. Pat. No. 5,296,206, Using Flue Gas Energy to Vaporize Aqueous Reducing Agent for Reducing of $NO_x$ in Flue Gas, teaches yet another method where ambient air is drawn by a fan into an inlet. The air then travels through a heating tube, located in a boiler that is exposed to a hot flue gas flow within the boiler. The hot flue gas flow heats the heating tube, which in turn heats the air moving through the inside of the heating tube. The heated air eventually moves into a vaporizer. The heated air is mixed with the ammonia, and the mixture is sent to the injection grid for injection into the hot flue gas flow to perform the reduction reaction.

In order to prevent the formation of $NH_4HSO_4$ (ammonium bisulfate), which occurs when sulfur-bearing fuels are burnt, in the pipes of the gas re-circulation selective catalytic reduction system, the heated air entering the vaporizer must be very hot. If the temperature of the air moving through the gas re-circulation selective catalytic reduction system is above 250 degrees Celsius, ammonium bisulfate does not form at meaningful rates. Ammonium bisulfate is a sticky and corrosive substance that damages the equipment upon which it is formed. Therefore, it is preferable that when the diluted ammonia mixture exits the vaporizer that the temperature of the mixture be greater than 250 degrees Celsius in order to prevent the formation of ammonium bilsulfate on the insides of the pipes carrying the mixture.

Electric air heaters may be used to raise the air temperature within the vaporizer and thus raise the temperature of the diluted ammonia mixture exiting the vaporizer in order to prevent the formation of ammonium bisulfate on the pipes "downstream" from the vaporizer. However, the power consumption of these electric heaters is very high, as are the maintenance costs.

A more common system for raising the air temperature of the diluted ammonia mixture is to utilize the hot flue gas, or hot combustion air, from the boiler to mix and vaporize the ammonia to produce the diluted ammonia mixture. The diluted ammonia mixture is then distributed into the hot flue gas flow in the boiler to perform the reduction reaction. The hot flue gas system is known as a hot gas re-circulation system and is the most common system used in conjunction with aqueous $NH_3$. The hot gas re-circulation system extracts the hot flue gas from a boiler or gas turbine by way of a fan. The fan delivers the hot gas to the vaporizer. Two main factors determine the amount of hot gas required: (1) the vaporizer inlet temperature (extraction temperature); and (2) the vaporizer outlet temperature. Typically, the vaporizer inlet temperature is a fixed value of about 370 to 399 degrees Celsius (700 to 750 degrees Fahrenheit) (the typical temperature of the hot flue gas within the boiler); and the vaporizer outlet temperature is a temperature determined to prevent the formation of ammonium bisulfate when sulfur-bearing fuels are burnt in the boiler or gas turbine, typically at a temperature of at least 250 degrees Celsius (482 degrees Fahrenheit).

Hot gas re-circulation systems require large fans to propel the hot flue gas into the vaporizer, as well as large pipes in order to carry the hot gases and mixtures. Larger fans have higher power consumption and maintenance costs than smaller fans, and larger pipes have greater costs than smaller pipes.

SUMMARY OF THE INVENTION

An object of an embodiment of the present invention is to provide a method for efficient utilization of a gas re-circulation selective catalytic reduction system.

Another object of an embodiment of the present invention is to provide a gas re-circulation selective catalytic reduction system having low power consumption.

Another object of an embodiment of the present invention is to provide a gas re-circulation selective catalytic reduction system having low maintenance costs.

Another object of an embodiment of the present invention is to provide a gas re-circulation selective catalytic reduction system that utilizes small pipes within the system.

Another object of an embodiment of the present invention is to provide a gas re-circulation selective catalytic reduction system that utilizes relatively low temperature gases in the system.

In the present invention, a vaporizer is provided for producing a diluted reducing agent. A reducing agent source, for storing a reducing agent, has a reducing agent pipe interconnected to the vaporizer. A re-circulation gas pipe is adapted to carry gas from a gas flow to the vaporizer. A dilution fan may be provided for propelling the gas from the gas flow to the vaporizer. An injector, connected to the vaporizer by a diluted reducing agent pipe, injects the diluted reducing agent into the gas flow. A heat trace is coupled to the diluted reducing agent pipe and the injector for maintaining a predetermined temperature of the diluted reducing agent pipe and the injector.

The present invention also comprises the steps of mixing a reducing agent and gas from a gas flow in a vaporizer to produce a diluted reducing agent. Then, a diluted reducing agent pipe and an injector are heated with a heat trace for maintaining a predetermined temperature of the diluted reducing agent pipe and the injector. The diluted reducing agent pipe interconnects with the vaporizer and the injector. The diluted reducing agent is then injected into the gas flow.

In an alternative embodiment, the present invention includes a vaporizer for producing a diluted ammonia mixture. An ammonia source, for storing an ammonia fluid, has an ammonia pipe interconnected to the vaporizer. A re-circulation gas pipe is provided and adapted to carry gas from a gas flow to the vaporizer. A dilution fan propels the gas from the gas flow to the vaporizer. An air pipe is connected to the vaporizer for providing air to the vaporizer to atomize the ammonia. An injector, connected to the vaporizer by a diluted ammonia pipe, injects the diluted ammonia mixture into the gas flow. The injector includes an adjustment header for distributing the diluted ammonia mixture, a distribution pipe connected to the adjustment header for carrying the diluted ammonia mixture, and an injection grid connected to the distribution pipe for injecting the diluted ammonia mixture into the gas flow. A heat trace is coupled to the diluted ammonia pipe, the adjustment header, and the distribution pipe for maintaining a predetermined temperature sufficient to substantially prevent the formation of $NH_4HSO_4$ on the diluted ammonia pipe, the adjustment header, and the distribution pipe.

DETAILED DESCRIPTION OF THE DRAWINGS

DETAILED DESCRIPTION OF THE PREFERRED EMBODIMENTS

Figure 1:
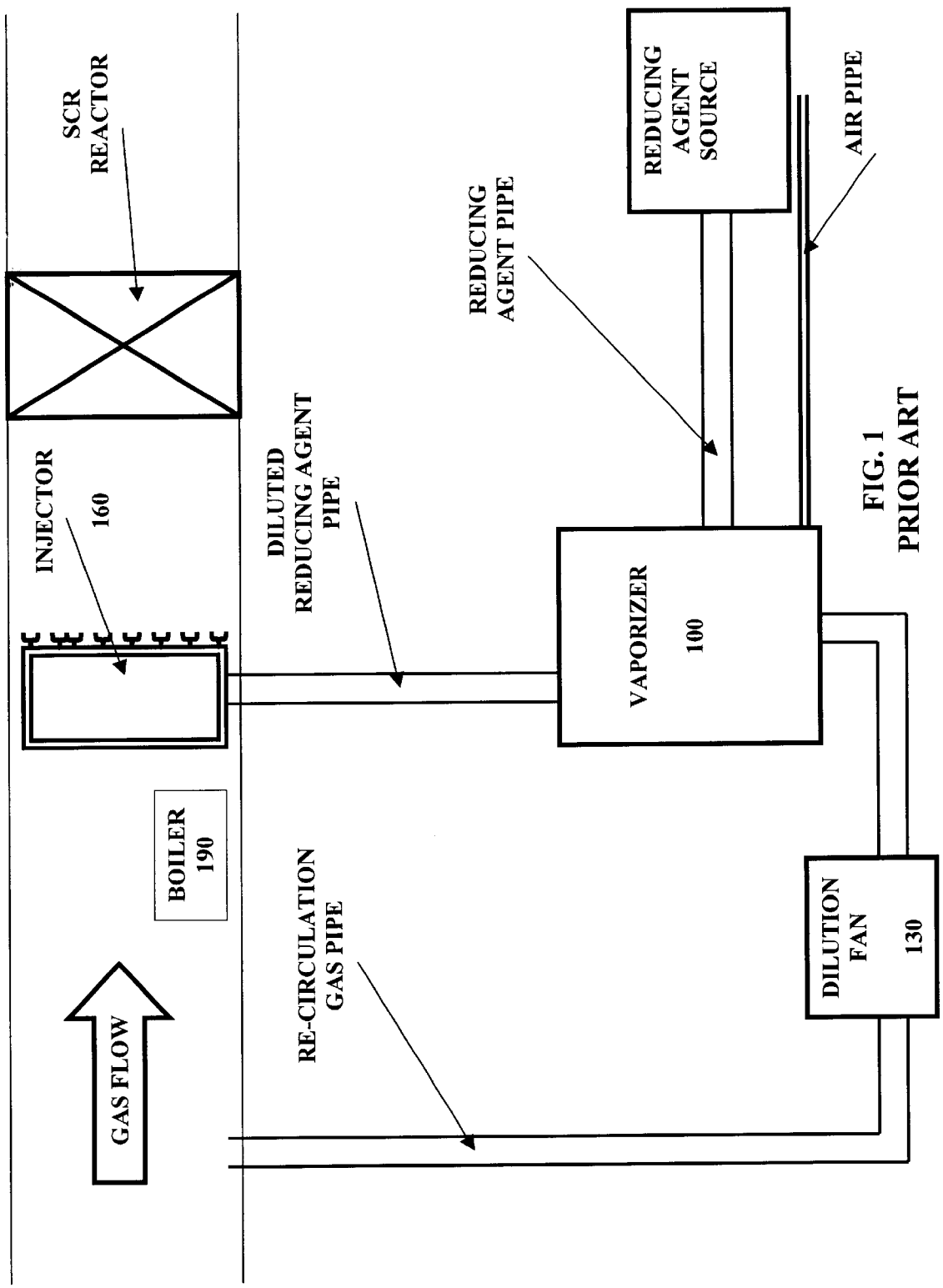
FIG. 1 illustrates a prior art gas re-circulation selective catalytic reduction system.
Figure 2:
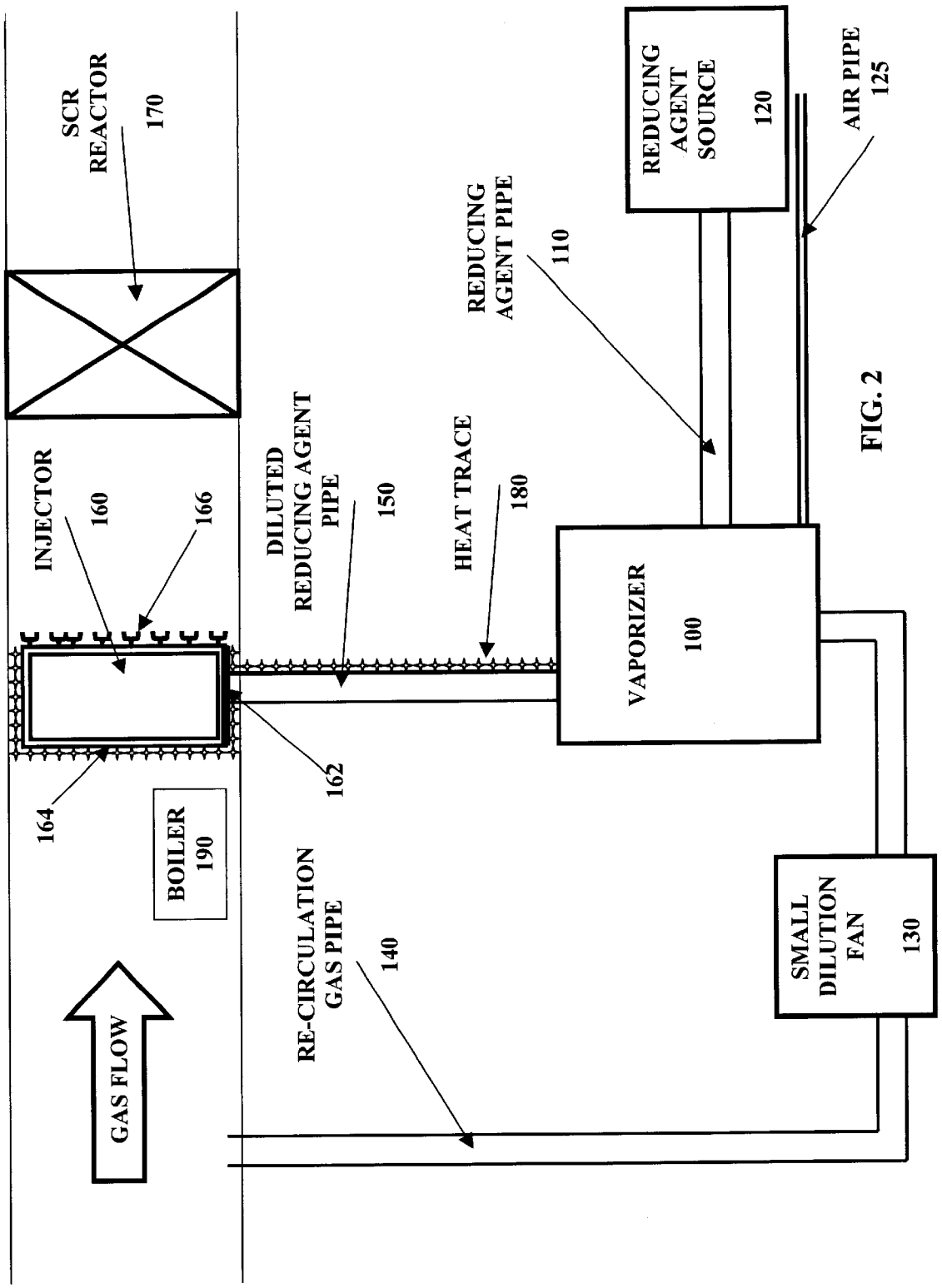
FIG. 2 illustrates a gas re-circulation selective catalytic reduction system according to an embodiment of the present invention.

FIG. 2 illustrates a gas re-circulation selective catalytic reduction system according to an embodiment of the present invention. The gas re-circulation selective catalytic reduction system of FIG. 2 has similar components as the gas re-circulation selective catalytic reduction system in FIG. 1. The vaporizer 100, which mixes the hot gas and reducing agent (along with the atomizing air) produces the diluted reducing agent mixture for performing the reduction reaction. The reducing agent source 120 (aqueous ammonia tank) is connected to the vaporizer 100 by the reducing agent pipe 110 for carrying the reducing agent (ammonia) to the vaporizer 100. The air pipe 125 may also be connected to the vaporizer 100 for providing air for atomizing the reducing agent inside the vaporizer 100. Hot gas is provided to the vaporizer 100 by the re-circulation gas pipe 140, which is connected to the boiler 190. A small dilution fan 130 is used to draw the hot gas from the gas flow in the boiler 140 down through the re-circulation gas pipe 140 and into the vaporizer 100. Inside the vaporizer 100, the reducing agent is diluted by the hot gas and the atomizing air to produce a diluted reducing agent mixture, which is then sent to the boiler 190 via the diluted reducing agent pipe 150. The diluted reducing agent mixture goes to an injector 160, which injects the diluted reducing agent mixture into the gas flow within the boiler 190 and performs the reduction reaction with the help of the selective catalytic reduction reactor 170 located downstream from the diluted reducing agent mixture and the gas flow.

The gas re-circulation selective catalytic reduction system in FIG. 2 includes a heat trace 180 coupled to the diluted reducing agent pipe 150 and the injector 160. The heat trace 180 may be an electric trace or a steam trace. Electric heat tracing is preferably used. By utilizing a heat trace 180 around the diluted reducing agent pipe 150 and the injector 160, the outlet temperature from the vaporizer 100 does not need to be as high as in the FIG. 1 system because the heat trace 180 maintains a predetermined temperature inside the diluted reducing agent pipe 150 and the injector 160 sufficient to prevent the formation of ammonium bisulfate.

Because the outlet inlet temperature may be lower than, for example, the gas re-circulation selective catalytic reduction system in FIG. 1, a smaller dilution fan 130 (or fewer dilution fans, as some systems utilize more than one fan) may be used. A smaller dilution fan 130 (or fewer dilution fans) means that the power consumption for the entire system is lowered. Additionally, because lower inlet temperatures are used, the re-circulation gas pipe 140 may be smaller as well.

The heat trace 180 is preferably a mineral-insulated high temperature heating cable. The heat trace 180 heating cable is preferably coupled or wrapped around the exterior of the diluted reducing agent pipe 150 and the injector 160 to maintain a desired temperature inside the surfaces of the pipe 150 and injector 160. An example of a mineral-insulated high temperature heating cable that may be used is the Chromalox-brand G-18 mineral-insulated high temperature heating cable. The G-18 heating cable has an outer sheath made of Alloy 825, which resists damage during installation and provides a reliable electrical ground for safe operation. The G-18 mineral-insulated heating cable will not burn or support combustion, and all materials are inorganic and do not deteriorate with age. The preferred G-18 heating cable set configuration is the two-conductor heating cable design where the two conductors terminate at one end of the entire heating cable to be connected to a power source.

The exterior of the heat trace 180 itself is preferably insulated so as to minimize heat loss to the surrounding ambient air, as gas re-circulation selective catalytic reduction systems are generally outdoors and subject to seasonal conditions. The insulation may be of any appropriate material, such as calcium silicate or mineral wool.

The diluted reducing agent pipe 150 supplies the diluted reducing agent mixture to the injector 160, which also has the heat trace 180 coupled thereto. The injector 160 is preferably comprised of an adjustment header 162, which regulates the flow of the diluted reducing agent mixture (ammonia/hot gas mixture) to distribution pipes 164 that are interconnected to the adjustment header 162 and an injection grid 166, which injects the mixture into the gas flow. The distribution pipes 164 are preferably each regulated by a high-temperature damper/flowmeter. In the preferred embodiment, twelve distribution pipe 164 branches are utilized, with flow to each branch from the adjustment header 162 to be 0% to 15% of the entire flow of the mixture into the adjustment header 162. The flow from each distribution pipe 164 branch enters the injection grid 166, which is comprised of piping that evenly distributes the hot gas and ammonia mixture for injection into the gas flow within the boiler 190.

The nominal gas flow into the adjustment header 162 is preferably about 22,548 lbs./hour, with the maximum gas flow into one distribution pipe 164 branch being about 3382 lbs./hour. The nominal gas temperature in the diluted reducing agent pipe 150 and the injector 160 is preferably about 210 degrees Celsius (410 degrees Fahrenheit), and the minimum pipe surface temperature is preferably around 300 degrees Celsius (572 degrees Fahrenheit).

Figure 3:
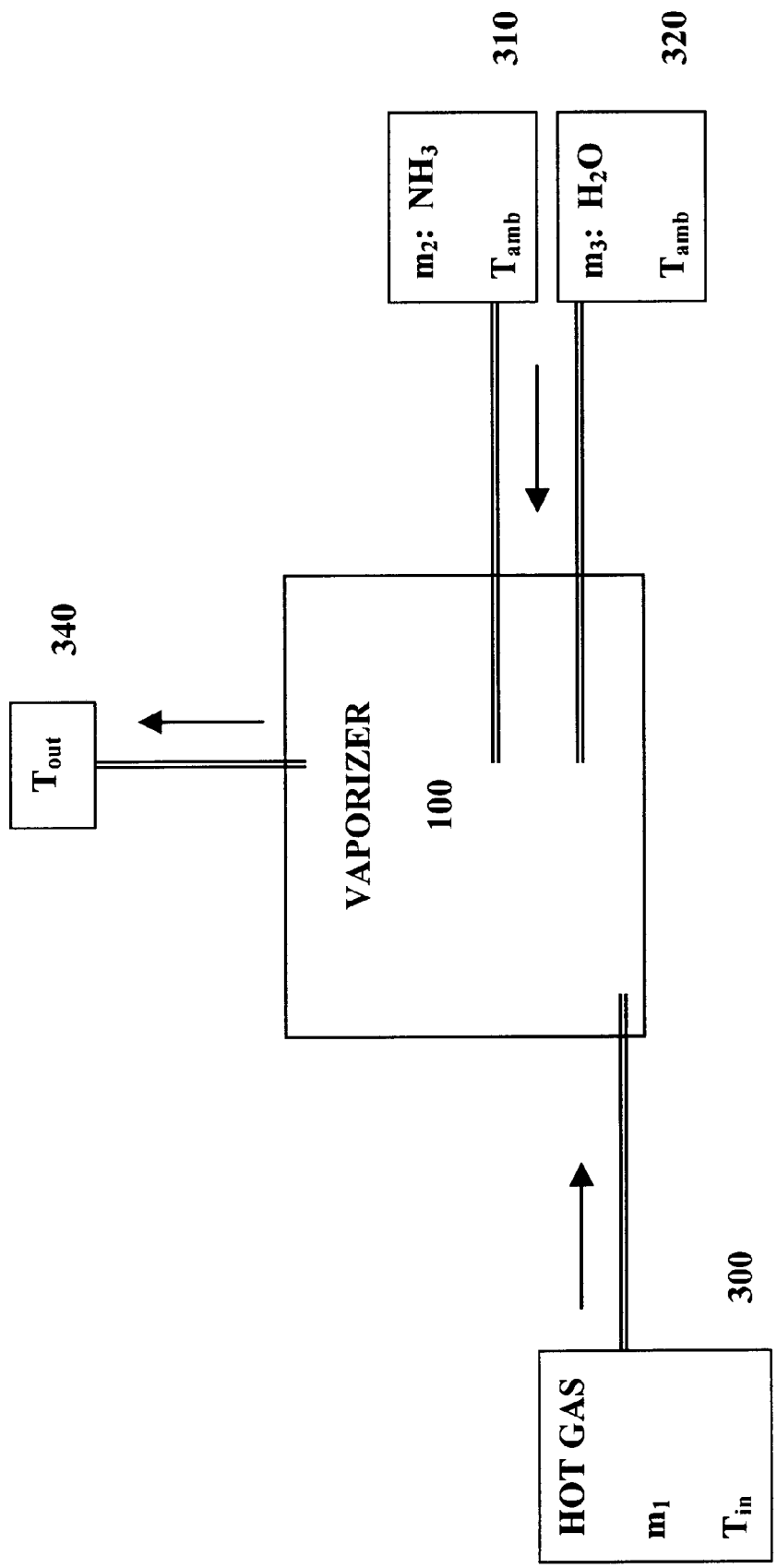
FIG. 3 illustrates the components for a mass flow equation of a gas re-circulation selective catalytic reduction.

FIG. 3 illustrates the components for a mass flow equation of a gas re-circulation selective catalytic reduction. By using a heat trace 180 (shown in FIG. 2), a lower inlet temperature ($T_{in}$) may be used and still prevent the formation of ammonium bisulfate inside the pipes located "downstream" from the vaporizer 100. Because a lower inlet temperature is required, the amount of hot gas mass flow may thus be reduced. The equation for $m_1$ below determines the hot gas mass flow 300 required to sustain a particular vaporizer outlet temperature ($T_{out}$) 340, wherein the terms in the equation have the meanings identified in the following table.

TABLE $$m_1 = \frac{m_2 c_2^L (Tv_2 - T_{amb}) + l_2 + m_2 cp_2^V (T_{out} - Tv_2) + m_1 cp_1^L (Tv_1 - T_{amb}) + l_1 + m_1 c_1^V (T_{out} - Tv_1)}{(T_{in} - T_{out}) cp^G}$$

m: mass flow  
T: temperature  
$T_{in}$: hot flue gas vaporizer inlet temperature  
$T_{out}$: vaporizer outlet temperature  
$T_{amb}$: ambient temperature  
cp: constant-pressure specific heat (kJ)

l: evaporation heat (kJ/kg)

Superscript:  
V: vapor phase  
L: liquid phase  
G: gas phase

Subscript:  
1: hot flue gas  
2: $NH_3$  
3: water

For example:  
$Tv_2$ is the temperature of the ammonia in vapor phase;  
$cp_2^L$ is the constant-pressure specific heat of the ammonia in liquid phase; and  
$l_1$ is the evaporation heat of the hot flue gas.

It is desirable to maintain the vaporizer outlet temperature 340 to be around 210 degrees Celsius (410 degrees Fahrenheit). The hot gas mass flow 300 used for the gas re-circulation selective catalytic reduction system in FIG. 2 is less than that in the system of FIG. 1 because a lower vaporizer outlet temperature 340 is required by the system in FIG. 2 due to the use of the heat trace 180. A smaller dilution fan 130 and smaller pipes may be used because of the lower vaporizer outlet temperature 340 required. Other factors that affect the hot gas mass flow ml equation include the mass flow of the aqueous ammonia (reducing agent) $m_2$ and its ambient temperature 310, and the mass flow of the $H_2O$ (water) used to dilute the aqueous ammonia and its ambient temperature 320. Because gas re-circulation selective catalytic reduction systems vary in size, the hot gas mass flow required for each particular system varies depending upon the requirements of each system.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A gas re-circulation selective catalytic reduction system comprising:
    a vaporizer for producing a diluted reducing agent;
    a reducing agent source, for storing a reducing agent, and having a reducing agent pipe interconnected to the vaporizer;
    a re-circulation gas pipe adapted to carrying gas from a gas flow to the vaporizer;
    an injector, connected to the vaporizer by a diluted reducing agent pipe, for injecting the diluted reducing agent into the gas flow; and
    a heat trace coupled to the diluted reducing agent pipe for maintaining a predetermined temperature sufficient to substantially prevent formation of $NH_4HSO_4$ (ammonium bisulfate) in the diluted reducing agent pipe during normal operation.

2. The gas re-circulation selective catalytic reduction system in claim 1, further including a dilution fan for propelling the gas from the gas flow to the vaporizer.

3. The gas re-circulation selective catalytic reduction system in claim 1, wherein the heat trace is coupled to the injector for maintaining a predetermined temperature of the injector.

4. The gas re-circulation selective catalytic reduction system in claim 1, wherein the injector comprises:
    an adjustment header for distributing the diluted reducing agent;
    a distribution pipe connected to the adjustment header for carrying the diluted reducing agent; and
    an injection grid connected to the distribution pipe for injecting the diluted reducing agent into the gas flow.

5. The gas re-circulation selective catalytic reduction system in claim 1, further including:
    an air pipe connected to the vaporizer for providing air to the vaporizer to atomize the reducing agent.

6. The gas re-circulation selective catalytic reduction system in claim 1, wherein the heat trace is an electrical heat trace.

7. The gas re-circulation selective catalytic reduction system in claim 6, wherein the electrical heat trace is a mineral-insulated heating cable.

8. The gas re-circulation selective catalytic reduction system in claim 1, wherein the heat trace is a steam heat trace.

9. The gas re-circulation selective catalytic reduction system in claim 1, wherein the reducing agent is $NH_3$.

10. The gas re-circulation selective catalytic reduction system in claim 1, wherein the predetermined temperature is at least 250 degrees Celsius.

11. The gas re-circulation selective catalytic reduction system in claim 1, wherein an outlet temperature of the diluted reducing agent from the vaporizer is at most 210 degrees Celsius.

12. A method of efficient utilization of a gas re-circulation selective catalytic reduction system, the method comprising the steps of:

mixing a reducing agent and gas from a gas flow in a vaporizer to produce a diluted reducing agent;

heating a diluted reducing agent pipe with a heat trace for maintaining a predetermined temperature sufficient to substantially prevent formation of $NH_4HSO_4$ (ammonium bisulfate) in the diluted reducing agent pipe during normal operation, wherein the diluted reducing agent pipe interconnects the vaporizer and an injector; and injecting the diluted reducing agent into the gas flow.

13. The method in claim 12, further including the step of heating the injector with the heat trace for maintaining a predetermined temperature of the injector.

14. The method in claim 12, wherein the step of injecting the diluted reducing agent utilizes an injector, the injector comprising:

an adjustment header for distributing the diluted reducing agent;

a distribution pipe connected to the adjustment header for carrying the diluted reducing agent; and an injection grid connected to the distribution pipe for injecting the diluted reducing agent into the gas flow.

15. The method in claim 12, wherein the diluted reducing agent is produced by atomizing the reducing agent with atomizing air from an air pipe connected to the vaporizer.

16. The method in claim 12, wherein the heat trace is an electrical heat trace.

17. The method in claim 16, wherein the electrical heat trace is a mineral-insulated heating cable.

18. The method in claim 12 wherein the heat trace is a steam heat trace.

19. The method in claim 12, wherein the reducing agent is $NH_3$.

20. The method in claim 12, wherein the predetermined temperature is at least 250 degrees Celsius.

21. The method in claim 12, wherein an outlet temperature of the diluted reducing agent from the vaporizer is at most 210 degrees Celsius.

22. A gas re-circulation selective catalytic reduction system comprising:

a vaporizer for producing a diluted ammonia mixture;

an ammonia source, for storing an aqueous ammonia, and having an ammonia pipe interconnected to the vaporizer;

a re-circulation gas pipe adapted to carrying gas from a gas flow to the vaporizer;

a dilution fan for propelling the gas from the gas flow to the vaporizer;

an air pipe connected to the vaporizer for providing air to the vaporizer to atomize the aqueous ammonia;

an injector, connected to the vaporizer by a diluted ammonia pipe, for injecting the diluted ammonia mixture into the gas flow, the injector including an adjustment header for distributing the diluted ammonia mixture, a distribution pipe connected to the adjustment header for carrying the diluted ammonia mixture, and an injection grid connected to the distribution pipe for injecting the diluted ammonia mixture into the gas flow; and a heat trace coupled to the diluted ammonia pipe, the adjustment header, and the distribution pipe for maintaining a predetermined temperature sufficient to substantially prevent the formation of $NH_4HSO_4$ (ammonium bisulfate) in the diluted ammonia pipe, the adjustment header, and the distribution pipe during normal operation.

23. The gas re-circulation selective catalytic reduction system in claim 22, wherein the heat trace is an electrical heat trace.

24. The gas re-circulation selective catalytic reduction system in claim 23, wherein the electrical heat trace is a mineral-insulated heating cable.

25. The gas re-circulation selective catalytic reduction system in claim 22, wherein the heat trace is a steam heat trace.

26. The gas re-circulation selective catalytic reduction system in claim 22, wherein the predetermined temperature is at least 250 degrees Celsius.

27. The gas re-circulation selective catalytic reduction system in claim 22, wherein an outlet temperature of the diluted ammonia mixture from the vaporizer is at most 210 degrees Celsius.

* * * * *